United States Patent [19]
Blacksmith et al.

[11] 4,132,988
[45] Jan. 2, 1979

[54] RADAR INTRUSION DETECTION SYSTEM

[75] Inventors: Philipp Blacksmith, Concord; J. Leon Poirier, Chelmsford; Frederick S. Holt, Winchester, all of Mass.

[73] Assignee: The United States of America as represented by the Secretary of the Air Force, Washington, D.C.

[21] Appl. No.: 826,082

[22] Filed: Aug. 19, 1977

[51] Int. Cl.² .......................................... G08B 13/18
[52] U.S. Cl. .............................. 340/552; 343/5 PD
[58] Field of Search ................. 343/5 PD; 340/258 B

[56] References Cited
U.S. PATENT DOCUMENTS

3,688,298  8/1972  Miller et al. .................... 340/258 B

Primary Examiner—T.H. Tubbesing
Attorney, Agent, or Firm—Joseph E. Rusz; George Fine

[57] ABSTRACT

A radar intrusion detection system for isolated resources uses only one bistatic radar in combination with multiple passive reflectors to define the zone to be protected. Any intruder crossing a boundary of the zone within which is located the isolated resources interrupts the radar beam and thus may sound an alarm.

1 Claim, 3 Drawing Figures

RADAR INTRUSION DETECTION SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention provides a method of simplifying and improving conventional beam breaker radar systems used for intruder detection devices around high value isolated resources like parked aircraft. In present systems, four separate radars are located at the corners of a square which defines the zone to be protected. Any intruder crossing a boundary of the zone interrups the radar beam and sounds an alarm.

The present invention uses only one active bistatic radar, three or four passive reflectors to redirect the beam at the corners, and, if needed, some passive in-line focusing devices. This reduces the number of components required and provides other advantages such as reduced economic costs.

One of the novel features of this system is the use of passive reflectors at the corners of the protected zone to redirect the radar beam. Another feature is the use of phase cancelling and balancing techniques to increase system sensitivity. Yet another feature enables greater flexibility in system design since transmitter and receiver are co-located and power need may be supplied to only one point on the perimeter.

It is further noted that the radar intrusion system improves performance in a number of ways such as: (a) requires fewer active components so that it is cheaper and more reliable; (b) no loss of sensitivity at corners; (c) reflectors are efficient passive devices; (d) shape of protected area can be changed by moving only passive devices, and (e) enables greater flexibility in system design since power requirements are greatly reduced.

SUMMARY OF THE INVENTION

A radar intrusion detection system for isolated resources such as parked aircraft, trucks, and other fixed structures is provided. A single bistatic radar is used in combination with three or four passive reflectors to redirect the single radar beam at the corners of the area including the isolated resources thus defining the zone to be protected. Any intruder crossing a boundary of the zone interrupts the radar beam and thus may sound an alarm. If needed, some passive in-line focusing devices may be utilized. There may also be used phase cancelling and balancing apparatus to increase system sensitivity.

DETAILED DESCRIPTION OF THE PREFERRED EMBODIMENT

Figure 1:
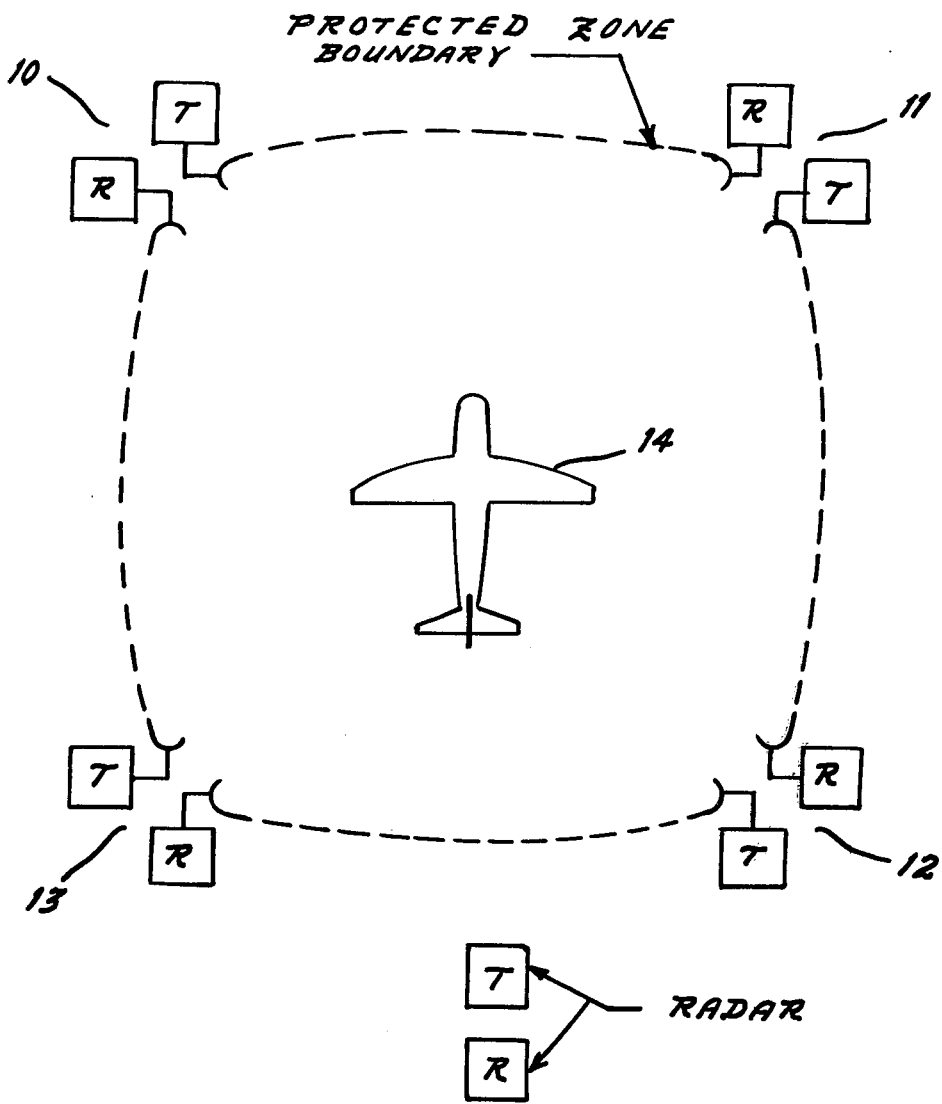
FIG. 1 shows in block diagram form a conventional radar intrusion system.

Now referring to FIG. 1 showing a prior art beam breaker radar detection system, a number (usually four) of bistatic radars 10, 11, 12 and 13 are set up; one on each side of the zone (often square) within which the object 14 such as a pane to be protected is located. Any intrusion across the boundary of the zone alters the radar beam which is manifested as a change in the signal level received on that boundary. This change in level is used to trigger an alarm associated with the radar. Systems of this type typically operate at microwave frequencies 10–35 GHz and can protect an area of 500–2000 feet on a side.

Some of the disadvantages of such systems include the multiple radar units which are required, high power consumption, low sensitivity zones at the corners, and relatively high cost. The present invention outlines a system which overcomes these disadvantages.

Figure 2:
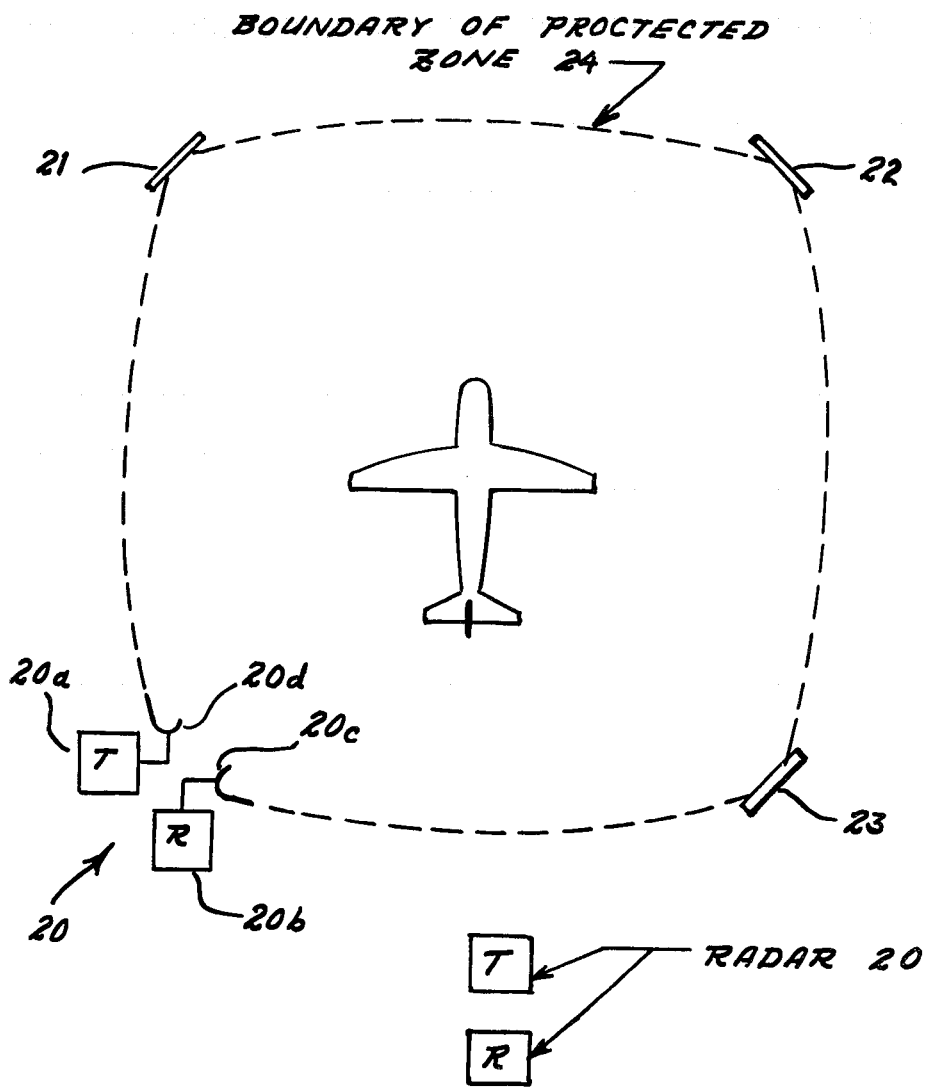
FIG. 2 shows in block diagram form a single radar intrusion detection system of the present invention.

The system shown in block diagram form in FIG. 2 is the preferred embodiment and shows single co-located bistatic radar 20. Radar 20 includes ransmitter 20a and receiver 20b. At each corner of the protected zone, passive reflectors 21, 22 and 23 redirect the beam originating at radar transmitter 20a. After reflections, the entire zone is enclosed and the beam is intercepted by receiving antenna 20c. The reflectors are passive, can be flat or shaped, and have near unity gain. Any intrusion across boundary 23 of the zone alters the radar beam which is manifested as a change in the signal level received on that boundary. This change in level may be used to trigger an alarm.

Figure 3:
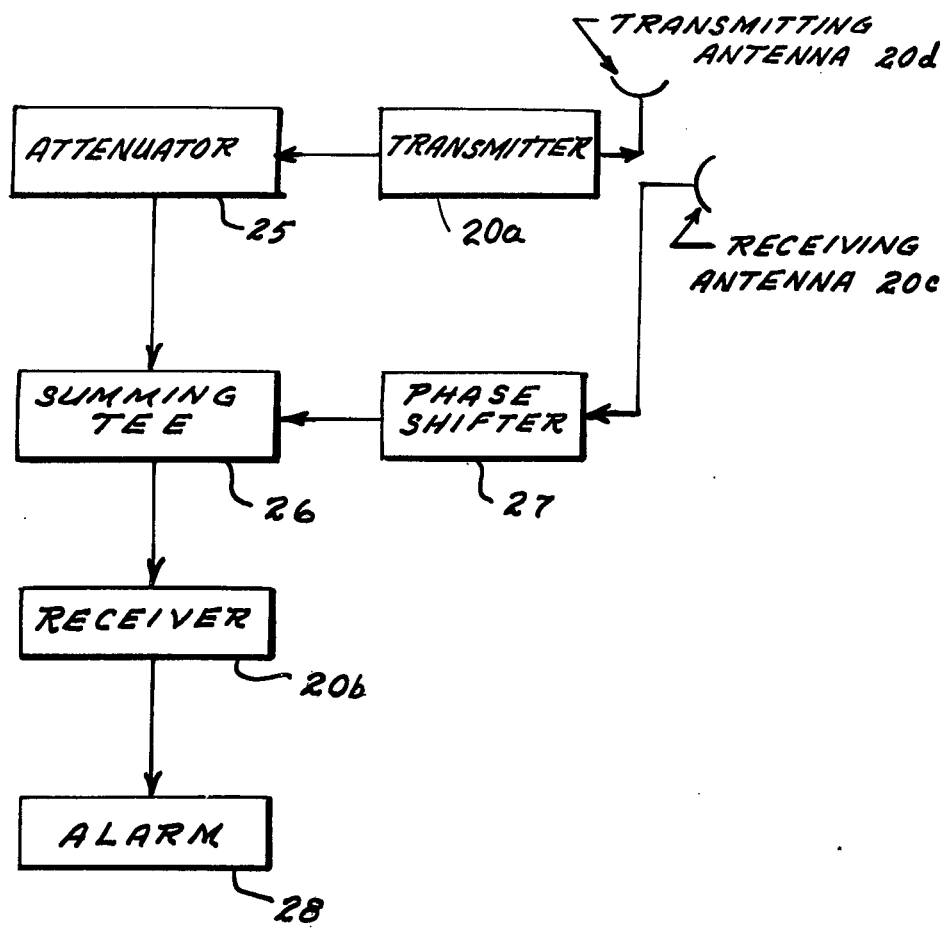
FIG. 3 shows in block diagram form the cancellation apparatus for improved sensitivity.

An additional feature of this system is that the transmitter and receiver are co-located so that better detection and signal processing methods can be used. For example, fully coherent detection is possible as well as direct phase cancellation as shown in FIG. 3. Transmitter antenna 20d and receiver antenna 20c are the antennas shown in FIG. 2. A portion of the signal from transmitter 20a (identical to transmitter 20a of FIG. 2) is used to balance out the signal received by way of receiving antenna 20c. The aforementioned portion of the transmitter signal is fed to summing tee 26 by way of attenuator 25. Summing tee 26 also simultaneously is fed the received signal by way of phase shifter 27. Receiver 20b (identical to the one shown in FIG. 2) accepts the summed signal which then is used to trigger alarm 28. Any small change in the received signal caused by an intruder upsets the balance and produces a large output from the receiver. The system sensitivity is thus greatly increased.

It is emphasized that the system as described results in low cost because fewer components are required. It is more reliable because of fewer components. There is no loss of sensitivity at the corners. The reflectors are inexpensive, efficient and reliable. There is better signal processing. Finally, protected areas can be modified by changing only passive elements.

What is claimed is:

1. A radar intrusion detection system for protection of isolated resources such as planes comprising a single active bistatic radar having a co-located transmitter, associated transmitter antenna, a receiver and associated receiver antenna, an attenuator receiving the transmitter signal, a phase shifter fed the signal from the receiver antenna, a summary tee simultaneously receiving signals from said phase shifter and said attenuator, the resultant being fed to said receiver, a multiplicity of passive reflectors, each passive reflector being positioned in an associated separate corner, said radar transmitter antenna projecting a radar beam toward the first of said multiplicity of passive reflectors for redirection to the next passive reflector for redirection to the next passive reflector and ultimately to said receiver antenna, the line between said transmitter antenna, said multiplicity of passive reflectors and said receiver antenna surrounding the isolated resources to be protected establishing a boundary and safe zone therein whereupon intrusion across said boundary an alteration of the radar beam occurs manifested as a change in signal level, and an alarm connected to said receiver, said alarm being triggered upon intrusion across said boundary.

* * * * *